United States Patent Office 3,493,617
Patented Feb. 3, 1970

3,493,617
PRODUCTION OF ALLYLIC-SUBSTITUTED
SECONDARY AND TERTIARY AMINES
Thomas M. Shryne, Walnut Creek, Edgar J. Smutny, San Francisco, and David P. Stevenson, San Leandro, Calif., assignors to Shell Oil Company, New York, N.Y., a corporation of Delaware
No Drawing. Filed Mar. 20, 1967, Ser. No. 624,217
Int. Cl. C07c 87/24
U.S. Cl. 260—583      8 Claims

ABSTRACT OF THE DISCLOSURE

The nonallylic moiety of allylic aryl ethers and allylic carboxylate esters of organic carboxylic acids, wherein the allylic moiety is of 3 to 12 carbons, is replaced by an organic primary or secondary amine moiety in a transallylation process catalyzed by palladium, platinum or rhodium compounds complexed with tertiary phosphine ligands to produce secondary or tertiary organic amines, containing at least one N-allylic substituent and useful for conversion to detergents and herbicides.

PRIOR ART

The direct alkylation of a primary amine with an alkyl halide results in the formation of secondary and tertiary amines in varying amounts, depending on the conditions of the reaction. Quite often, these products are contaminated with unchanged amine and quaternary ammonium salts. Illustrative of alkylation with allyl halides to give olefinic amines is the disclosure of A. W. Weston, A. W. Ruddy and C. M. Suter, J. Am. Chem. Soc. 65, 674 (1953), of the reaction of allyl chloride with dimethylamine hydrochloride to produce N,N-dimethylallylamine in 30% yield and with ethylamine to produce N-ethylallylamine in 43% yield. A method to produce allylic-substituted secondary and tertiary amines in high purity and with high selectivity would advance the art.

THE INVENTION

It has now been found that secondary or tertiary organic amines, wherein there is present at least one N-allylic substituent are produced with high selectivity by reacting an allylic aryl ether or an allylic carboxylate ester of an organic carboxylic acid with an organic amine, wherein there is present at least one N-hydrogen substituent, in the presence of certain meteal compounds as catalyst. Although the mechanism of the process is not completely understood, it may be described as a transallylation process in which the organic amine displaces the nonallylic moiety of the allylic starting reagent, i.e., the aryloxy moiety of the allylic ether or the acyloxy moiety of the allylic ester, to efficiently produce a secondary or tertiary organic amine having as a nitrogen substituent the allylic moiety of the starting reagent. By way of illustration, from the reaction of allyl acetate or allyl phenyl ether with diethylamine is obtained N,N-diethylallylamine in >95% conversion.

REACTANTS

The allylic reagent employed as reactant in the process of the invention is either an allylic aryl ether or an allylic carboxylate ester of an organic carboxylic acid. The allylic moiety of this reagent may be unsubstituted or substituted on any of the three carbons of the fundamental allyl grouping with saturated or unsaturated hydrocarbyl substituents, preferably alkyl or alkenyl groups, of 1 to 9 carbon atoms. When this moiety is unsubstituted, it is the well known allyl (2-propenyl) group. Substitution on the 3-carbon may be exemplified by a crotyl or 2,7-octadienyl group. Substitution on the 2-carbon may be illustrated by a methallyl group, and similarly on the 1-carbon, by a 1-vinyl-5-hexenyl group. Thus the allylic moiety is one of 3 to 12 carbon atoms; alternatively it may be described as an allyl moiety substituted with 0 to 9 carbon atoms.

The aryl portion of the allylic aryl ether is an aryl moiety illustratively obtained by removal of at least one hydroxyl group of a mono- to di-nuclear phenol having from 6 to 24 carbon atoms and from 1 to 3 phenolic hydroxyl substituents attached to each aromatic ring. The phenol precursor from which the aryl moiety is illustratively derived has from 1 to 3, preferably from 1 to 2, hydroxyl groups attached to each ring, and when the phenol is dinuclear, the aromatic rings are suitably fused, are attached directly by carbon-carbon bonds between ring carbon atoms, or are connected by an alkylene bridge of from 1 to 12 carbon atoms. The phenol precursor of the aryl moiety is an unsubstituted phenol, that is, it contains no substituents other than hydrogen and hydroxyl on the aromatic ring(s) or alternatively is a substituted phenol containing ring-carbon substituents other than hydrogen or hydroxyl, which substituents are hydrocarbyl, i.e., contain only atoms of carbon and hydrogen, or are nonhydrocarbyl containing atoms such as halogen, nitrogen or oxygen. When the phenol precursor is substituted, it is preferred that each substituent be an electron-donating substituent, which term is herein employed to indicate a substituent which is generally considered to be ortho-para directing when attached to an aromatic ring. Illustrative of such electron-donating substituents are alkyl including cycloalkyl, halogen, particularly halogen of atomic number from 17 to 35, i.e., chlorine and bromine, alkoxy, aryloxy, dialkylamino, halomethyl and the like.

Exemplary mononuclear phenol precursors include phenol, p-chlorophenol, m-bromophenol, p-ethylphenol, 2,6-dimethylphenol, 2,4-dichlorophenol, p-tert-butylphenol, p-methoxyphenol, p-cyclohexylphenol, m-hexylphenol, 2,4-diethylphenol, p-dimethylaminophenol, hydroquinone, resorcinol, ethylhydroquinone, 2,5 - dichlorohydroquinone, phloroglucinol, and 5-methoxyresorcinol. Dinuclear phenols are illustrated by dinuclear phenols wherein the rings are fused, such as α-naphthol, β-naphthol, 1,4-dihydroxynaphthalene, 1,5 -dihydroxynaphthalene, 1,4,6-trihydroxynaphthalene, 4 - chloro - 1,8 - dihydroxynaphthalene, 4,8 - dimethyl - 1,5-dihydroxynaphthalene and 8-hydroxyquinoline; dinuclear phenols wherein the rings are attached directly by carbon-carbon bonds between ring carbon atoms; e.g., phenylphenol, 4,4' - dihydroxybiphenol, 2,4' - dihydroxybiphenyl, 3,4',5 - trihydroxybiphenyl, 2,2' - dichloro - 4,4' - dihydroxybiphenyl, 3,3'-dihydroxy - 5,5' - diethylbiphenyl and 3,4'-dihydroxy-5-butylbiphenyl, and dinuclear phenols wherein the rings are joined by an alkylene bridge of from 1 to 12 carbon atoms such as bis(4 - hydroxyphenyl)methane, 2,2-bis-(4-hydroxyphenyl)propane, 1,2 - bis(3,5 - dihydroxyphenyl) ethane, 3,3 - bis(2 - chloro - 4-hydroxyphenyl)hexane, bis(3 - hydroxy - 5 - methylphenyl)methane, bis(2,6-dimethyl - 4 - hydroxyphenyl)methane and 2,2-bis(2-propoxy-4-hydroxyphenyl)butane. In general, hydrocarbon or halohydrocarbon phenols, generically designated (halo) hydrocarbon phenols, are preferred precursors over phenols having non(halo)hydrocarbon substituents, and particularly preferred are unsubstituted mono- to di-nuclear phenols wherein each aromatic ring possesses a single hydroxyl substituent.

Allylic aryl ethers wherein the allylic group is alkadienyl, e.g., 2,7-octadienyl, are produced by the process of and described in copending application of E. J. Smutny, U.S. Ser. No. 455,965, filed May 14, 1965, now abandoned. When the allylic group is a lower molecular weight structure, such as allyl, methallyl, crotyl and the like, the ethers are obtained by the well-known Williamson synthesis.

The carboxylate portion of the allylic carboxylate ester is an acyloxy moiety illustratively obtained by removal of at least one active hydrogen atom from a carboxy group of an organic carboxylic acid of from 2 to 10 carbon atoms and having from 1 to 2 carboxy groups, with the proviso that the carboxy groups are bonded to noncarboxy carbon, present within the molecular structure and having no active hydrogen atoms other than that (those) of the carboxy group(s). The organic carboxylic acid precursor from which the acyloxy moiety is illustratively derived is suitably wholly aliphatic in character, wholly aromatic in character or incorporates both aliphatic and aromatic moieties. It may be saturated or unsaturated with either aromatic or aliphatic carbon-carbon unsaturation. The carboxylic acid precursor of the acyloxy moiety is a hydrocarbon carboxylic acid containing only atoms of carbon and hydrogen besides the oxygens of the carboxy group(s) present, or is a substituted-hydrocarbon carboxylic acid containing, in addition to atoms of carbon, hydrogen and carboxy oxygen, oxygen atoms other than carboxy oxygen atoms, which additional atoms are present in functional groups such as oxy, carbonyloxy, and the like.

Illustrative of suitable carboxylic acid precursors are wholly aliphatic carboxylic acids including hydrocarbon aliphatic carboxylic acids, both acyclic and cyclic, such as acetic acid, propionic acid, butyric acid, methacrylic acid, pivalic acid, hexanoic acid, 2-ethylhexanoic acid, decanoic acid, glutaric acid, adipic acid, 2-methylglutaric acid, cyclopentanecarboxylic acid, tetrahydronaphthalene-1-carboxylic acid, cyclohexane-1,4-dicarboxylic acid, and 1,4-bis(carboxymethyl)cyclohexane; as well as substituted hydrocarbon aliphatic carboxylic acids, both acyclic and cyclic, as exemplified by 3-acetoxy-propionic acid, 2-ethoxy ethanoic acid, tetrahydropyran-2-carboxylic acid and bis(2-carboxyethyl)ether.

Also suitable are carboxylic acid precursors which are wholly aromatic in character, as illustrated by hydrocarbon aromatic carboxylic acids such as benzoic acid, terephthalic acid, naphthalene-1-carboxylic acid, naphthalene-1,4-dicarboxylic acid and the like.

Carboxylic acids having both aromatic and aliphatic moieties are also suitable precursors of the acyloxy moiety. Such acids are exemplified by hydrocarbon carboxylic acids including phenylacetic acid, p-tert-butylbenzoic acid, m-toluic acid, tetrahydronaphthalene-2-carboxylic acid, 3,5-dimethylbenzoic acid and 5-methylisophthalic acid; as well as by substituted-hydrocarbon carboxylic acids, for example, 3-phenoxypropionic acid, m-methoxybenzoic acid, p-ethoxybenzoic acid and the like.

Particularly desirable are acyloxy moieties derived from monocarboxylic acids, especially hydrocarbon monocarboxylic acids of up to 6 carbon atoms. The class of lower aliphatic mono- and dicarboxylic acids comprising acetic acid, pivalic acid and adipic acid is a particularly preferred precursor for the acyloxy moiety.

Allylic carboxylate esters wherein the allylic group is alkadienyl, e.g. 2,7-octadienyl are produced by the process of and described in copending application of E. J. Smutny, U.S. Ser. No. 455,978, filed May 14, 1965, now U.S. Patent 3,407,224. When the allylic group is a lower molecular weight structure, such as allyl, methallyl, crotyl and the like, the esters are obtained by conventional synthetic methods.

The organic amine employed as reactant in the process of the invention is an organic amine having within the molecular structure thereof at least one amino moiety, i.e., a trivalent nitrogen atom wherein from 1 to 2 of the nitrogen substituent(s) is (are) hydrogen and the remaining nitrogen valences are bonded to substituent group(s) through a bond to a carbon atom. The process of the invention is broadly applicable to a wide variety of organic amines of complex or comparatively simple structure which have at least one N-mono- to N,N-dihydro-nitrogen moiety within the molecular structure. Best results, however, are obtained when the organic amine reactant employed in the process is of comparatively simple structure. The organic amine reactant suitably is an organic amine of up to 20 carbon atoms and is a monoamino compound or is a polyamino compound of up to 4 amino-nitrogen atoms, preferably up to 2. Whether the structure of the organic amine reactant of the present invention incorporates a plurality of amino moieties or only one amino moiety, at least one amino nitrogen has one N-hydrogen substituent, that is, the amino moiety is a secondary amino moiety, or has two N-hydrogen substituents, that is, the amine moiety is a primary amino moiety. The presence of other amino-nitrogen groups which are tertiary amine groups and therefore contain no N-hydrogen substituents is not detrimental to the process of the invention, but at least one amino moiety present in the organic amine reactant, preferably each amino moiety present, is nontertiary, i.e., is either primary or secondary amino having from 1 to 2 N-hydrogen substituents. The organic portion of the amine reactant is suitably wholly aliphatic in character or incorporates one or more aromatic moieties. Furthermore, the amine reactant is suitably a hydrocarbon amine having only atoms of carbon and hydrogen besides the amino nitrogen atom(s), or is a substituted-hydrocarbon amine containing atoms of oxygen and halogen, particularly up to 4 atoms of halogen of atomic number from 18 to 35 inclusive, i.e., the middle halogens chlorine and bromine, which atoms are incorporated within functional groups such as ether, keto, ester, hydroxy and halo groups.

Illustrative aliphatic amine reactants include aliphatic hydrocarbon monoamines such as methylamine, ethylamine, allylamine, n-butylamine, isobutylamine, 3-aminomethylheptane, n-dodecylamine, dimethylamine, dipropylamine, diallylamine, piperidine, methylhexylamine, cyclohexylamine, N-ethylcyclohexylamine and N-octyldodecylamine; aliphatic hydrocarbon polyamines as exemplified by ethylenediamine, trimethylenediamine, 1,4-diaminohexane, diethylenetriamine, 1-aminodecalin, pyrrolidine, N,N-bis(2-aminoethyl)methylamine, 1,8-bis(4 - aminobutylamino)octane and 1,4 - bis(aminomethyl)cyclohexane; and substituted hydrocarbon mono- and polyamines, e.g., 3-chloropropylamine, 2-methoxyethylamine, 2 - propoxy-1,3-diaminopropane. N-methyl-4-acetoxybutylamine, bis-(2-methylaminoethyl)ether, 1-amino-4,5 - dibromohexane and the like.

The class of suitable amines which incorporate aromatic moieties within the reactant molecular structure includes hydrocarbon wholly aromatic amines, e.g., aniline, benzidine, p-phenylenediamine, pyrrole, and α-naphthylamine; alkarylamines and aralkylamines such as benzylamine, o-tolidine, p-toluidine, β-phenylethylamine, N-methylaniline, 1,2,3,4-tetrahydroquinoline, 2-amino Tetralin, N-propylbenzylamine, N-butylaniline, N,N'-bis(ethylamino)benzene, 2,2-bis(4 - aminophenyl)propane, 2,6-dimethylaniline, N,N - bis(3 - aminophenyl)methylamine and 3-phenylpyrrolidine; and at least partially aromatic amines which are substituted hydrocarbon amines as ilustrated by p-chloroaniline, β-aminopyridine, m-methoxyaniline, p-dimethylaminoaniline, N-(3-chloropropyl)benzylamine, phenoxymethylamine, 4,4'-diamino-2,2'dibromobiphenyl, p-trichloromethylaniline, N-methyl-p-ethoxyaniline and 2,2-bis(4-amino-3-bromophenyl)propane.

In general, hydrocarbon and oxyhydrocarbon amines, generically designated (oxy)hydrocarbon amines, are preferred over amine reactants having atoms other than the carbon, hydrogen, oxygen, and the amino nitrogen atoms of the (oxy)hydrocarbon amine reactants, and monoamines are preferred over analogous polyamino compounds. Particularly preferred are primary and secondary hydrocarbon monoamines wherein the hydrocarbon moiety is hydrocarbon of up to 12 carbon atoms. The class of amines comprising dialkylamines, wherein any alkyl moiety is alkyl of up to 4 carbon atoms, including joined alkyl groups as in piperidine and substituted alkyl groups as in morpholine and β-ethylaminoethanol, provides particularly desirable results.

The optimum ratio of amine reactant to allylic reactant will depend in part upon the functionality of the amine reactant, that is, the number of nontertiary amino groups present in the amine reactant molecule, and the extent of conversion that is employed. Ratios of moles of nontertiary amino group to moles of allylic reactant as low as about 1:10 are suitable. However, to obtain higher conversions, a more substantial proportion of amine is preferred and molar ratios of nontertiary amino group to allylic reactant from about 1:4 to about 10:1 are more satisfactory. Best results are obtained when the molar ratio of nontertiary amino group to allylic reactant is from about 1:1 to about 6:1. It should be understood that it is within the contemplated scope of the invention to react, on occasion, only a portion of the nontertiary amino groups present in the amine reactant molecule. For example, in the case of a diamine, reaction takes place at both amine sites, or alternatively it is contemplated to effect reaction at only one amine group. The restrictive amine formation of the latter illustration is favored by molar reactant ratios comparatively high in the amine reactant.

CATALYST

The catalyst compositions employed in the process of the invention are certain metal compounds containing organic complexing ligand, the metal being palladium, platinum or rhodium. The catalyst comprises a complexed metal cationic moiety associated with an anionic moiety. Without wishing to be bound by an particular theory, it appears that the chemical transformations during the course of the reaction which involve the catalyst are quite complex, probably involving the formation and destruction of complexes between the metal moiety and the allylic reactant so that no one formula suitably describes the actual catalytic species. In one modification of the process of the invention, catalyst is introduced in a form represented by the formula $$L_mMZ$$

wherein Z is a carboxylate of a lower unsubstituted monocarboxylic acid of 2 to 7 carbon atoms, and $m$ is the integer 2 when M is palladium or platinum, and, when M is rhodium, Z is a halide selected from the group of chloride and bromide and $m$ is the integer 3 or Z is hydrogen and $m$ is the integer 4. Illustrative of useful carboxylates are acetate, propionate, butyrate, hexanoate and benzoate; especially preferred is the acetate. The term L in the above formula represents the ligand employed to stabilize the catalyst complex. Although ligands such as olefin are useful, the preferred ligand L is a tertiary phosphine. Thus, the preferred complexing ligands are phosphines represented by the formula $$R_3P$$

wherein R independently is an organo group having from 1 to 20 carbon atoms, preferably 1 to 10 (two of the R's may be joined to give a heterocyclic ring with the phosphorus atom), and having only aromatic unsaturation. R is therefore saturated aliphatic, including cycloaliphatic, or is aromatic in character, preferably mononuclear aromatic, and is hydrocarbyl, that is, contains only atoms of carbon and hydrogen, or is substituted hydrocarbyl containing, besides atoms of carbon and hydrogen, other atoms such as oxygen, sulfur, nitrogen, and halogen, particularly halogen of atomic number from 9 to 35, which atoms are present in functional groups such as alkoxy, carboalkoxy, acyl, trihalomethyl, halo, cyano, dialkylamino, sulfonylalkyl, alkanoyloxy and like groups having no active hydrogen atoms. A preferred class of nonhydrocarbyl substituents comprises an atom having an atomic number from 7 to 8, i.e., nitrogen or oxygen, one valence of which is satisfied by bonding to an otherwise hydrocarbyl R substituent, and the remaining valence(s) are satisfied by bonding to lower alkyl radicals which are alkyl of from 1 to 4 carbon atoms. Such preferred nonhydrocarbyl substituents are alkoxy wherein the alkyl moiety is alkyl of from 1 to 4 carbon atoms and N,N-dialkylamino wherein each alkyl independently is alkyl of from 1 to 4 carbon atoms.

Illustrative of suitable saturated aliphatic R groups are hydrocarbyl R groups such as methyl, ethyl, propyl, isopropyl, butyl, isooctyl, decyl, lauryl, stearyl, cyclohexyl, cyclopentyl, 3,4-dimethylcyclopentyl, cyclooctyl, benzyl and β-phenylethyl; as well as substituted groups such as 4-bromohexyl, methoxymethyl, 3-(diethylamino)propyl, 4-carbethoxybutyl, and 2-acetoxyethyl. Aromatic R groups include hydrocarbyl aromatic groups such as phenyl, tolyl, xylyl, p-ethylphenyl, p-tert-butylphenyl, m-octylphenyl, 2,4-diethylphenyl, p-phenylphenyl, m-benzylphenyl and 2,4,6-trimethylphenyl; and substituted hydrocarbyl aromatic R groups including p-methoxyphenyl, m-chlorophenyl, m-trifluoromethylphenyl, p-propoxyphenyl, p-carbethoxyphenyl, 2,4 - dichlorophenyl, 2 - ethyl-5-bromophenyl, p-dimethylaminophenyl, m-diethylaminophenyl, 3,5-dibutoxyphenyl, p-acetoxyphenyl, 2-hexyl-3-methylsulfonylphenyl, 3,5-bis(trichloromethyl)phenyl and 3-dibutylaminophenyl.

In the $R_3P$ ligand as defined above, the R moieties are the same or are different, although ligands wherein all R groups are the same are generally preferred. Exemplary R groups include phosphines such as triethylphosphine, tributylphosphine, triphenylphosphine, tris(4-methoxyphenyl)phosphine, tris(4-tolyl)phosphine, tris(3-chlorophenyl)phosphine, tris(4 - dimethylaminophenyl)phosphine, diphenylhexylphosphine, dimethyl(3 - methoxyphenyl)phosphine, dibutylstearylphosphine, tribenzylphosphine, cyclohexyldibutylphosphine, and the like. In general, phosphine ligands wherein the phosphorus substituents are aromatic are generally preferred over wholly aliphatic phosphine ligands. Largely because of economic reasons, triphenylphosphine is a particularly preferred ligand.

The $L_mMZ$ complexes, wherein M is palladium or platinum and Z is carboxylate as defined hereinabove, are prepared by treating the corresponding metal carboxylate, e.g. palladium acetate, with the desired tertiary phosphine ligand, e.g. triphenylphosphine, as described by T. A. Stephenson et al., J. Chem. Soc, 1965, 3632. The $L_mMZ$ complexes, wherein M is rhodium and Z is chloride or bromide, are described in copending application of K. C. Dewhirst, U.S. Ser. No. 417,481, filed Dec. 10, 1964, and where Z is hydrogen, in copending application of K. C. Dewhirst, U.S. Ser. No. 473,222, filed July 19, 1965.

In an alternate modification of the process, the catalyst is provided in the form of several components which can be considered forming the catalyst in situ. Employing palladium for purposes of illustration, the metal component is supplied as a π-allyl complex of palladium. The simplest member of this class is a π-allyl palladium salt which, when the anion is chlorine, is represented by the following formula

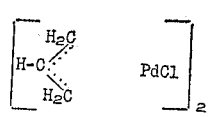

The preparation of this complex and related complexes is described by Huttel et al., Angew. Chemie, 71, 456

(1959). Other illustrative π-allyl complexes are represented by the formula

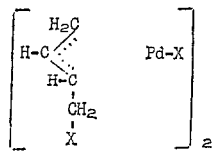

wherein X is halogen, which complexes are conveniently prepared by reaction of diene, e.g., butadiene or isoprene, with palladium halide in hydrocarbon media in the presence of other ligands, e.g., benzonitrile. Although alternate methods are available for calculating the oxidation state of the palladium present in such π-allyl complexes, it is herein considered that the palladium is palladium (II). It should be understood that analogous complexes of platinum and rhodium are also suitable. Tertiary phosphine ligand is furnished by including as a second component any of the teriary phosphines, e.g. triphenylphosphine, hereinabove described. The third component added can be considered a halogen removal agent and especially useful for this purpose are sodium borohydride, hypophosphorus acid, sodium formate, sodium phenoxide and the like. Alternatively the first and second components may be combined in one, as exemplified by dichlorobis-(triphenylphosphine)platinum(II), and introduced with one of the above-named halogen removal agents.

It is considered that in each above case the palladium, platinum or rhodium compound is added as catalyst or catalyst precursor in the process of the invention. Largely for reasons of convenience, economy and speed of reaction, the preferred metal-containing catalyst is a palladium-containing one. A particularly preferred catalyst is palladium acetate complexed with a tertiary phosphine ligand, for example, diacetatobis(triphenylphosphine)palladium(II).

The process of the invention is characterized by the requirement for only catalytic quantities of platinum, palladium or rhodium compound. Although utilization of larger amounts of metal-containing catalyst is not detrimental to the process of the invention, amounts larger than about 1 mole percent based on total reactants are not generally required. Amount of metal compound less than about 0.001 mole percent on the same basis are generally unsuitable because of the inevitable physical losses of catalyst during reaction and processing. In general, amounts of catalyst from about 0.01 mole percent to about 0.5 mole percent based on total reactants are satisfactory and are preferred.

REACTION CONDITIONS

The process of the invention is typically conducting by charging the reactants and catalyst to an autoclave or similar reactor and maintaining the reaction mixture at reaction temperature until reaction is complete. The method of mixing is not critical although it is generally preferred to mix the reactants and add the catalyst thereto. The reaction is suitably conducted throughout a wide range of reaction temperatures and pressures, so long as the reactants are maintained substantially in the liquid phase. Reaction temperatures from about −20° C. to about 150° C. are satisfactory, although temperatures from about 0° C. to about 120° C. are preferred and best results are obtained when a temperature from about 25° C. to about 90° C. is employed. Typical reaction pressures vary from about 1 atmosphere to about 80 atmospheres. Frequently, good results are obtained when the reaction pressure is autogenous, that is, the pressure generated when the reactants are maintained at reaction temperature in a sealed reaction vessel. Such pressures are from about 1 atmosphere to about 20 atmospheres.

The process of the invention is conducted in the presence or in the absence of a solvent. Solvents that are suitable are those capable of dissolving the reactants and catalyst, and are inert to the reactants and the products, thus in general being free from active hydrogen. Exemplary solvents are normally liquid ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; aromatic hydrocarbons such as benzene, toluene and xylene; N,N-dialkyl alkanoic acid amides and N-alkyl lactams, e.g. dimethylformamide, N,N-dimethylacetamide, N,N-diethylacetamide and N-methylpyrrolidinone; halogenated hydrocarbons such as chloroform, carbon tetrachloride, tetrachloroethylene and methylene chloride; sulfoxides such as dimethyl sulfoxide; and nitriles such as acetonitrile and benzonitrile. The solvent, if any, is employed in a wide range of molar amount and from about ⅓ mole of solvent up to about 150 moles per mole of total reactants are satisfactory; in general a molar excess over the amount of total reactants is preferred. For convenience, it is generally preferable to conduct the reaction in the absence of added solvent whenever the physical characteristics of the system at reaction temperature, particularly the melting point thereof, will allow. For example, when the process of the invention is employed with a reaction mixture normally liquid at reaction temperature, the process is typically conducted in the absence of solvent. Alternatively, if the reaction mixture is unduly viscous or normally solid at the reaction temperature, solvent is preferably employed to maintain the reactants in the liquid phase.

Subsequent to reaction, the reaction mixture is separated and the desired product recovered by conventional means such as selective extraction, fractional distillation and chromatographic techniques.

The amine products of the invention are N-(allylic) amines illustratively produced by reaction of the allylic reagent, e.g. an allylic aryl ether or allylic carboxylic ester, with the amine reactant to effect the transallylation or N-allylation, that is, to effect the introduction of the allylic moiety as a nitrogen-substitutent, of at least one of the nontertiary amino nitrogen moieties. In terms of the organic amine reactants as previously defined, the products of the invention are N-(allylic)amines wherein the allylic moiety is allyl substituted with from 0 to 9 carbon atoms, depending upon the particular allylic reagent employed, and the amine moiety is that moiety illustratively obtained by removal of at least one N-hydrogen substituent of an organic amine of up to 20 carbon atoms and of from 1 to 4 amino-nitrogen atoms, at least one of which is a nontertiary amino moiety, that is, possesses at least one hydrogen substitutent. The allylic moiety will be unsubstituted or substituted on any of the three carbons of the fundamental allyl grouping with saturated or unsaturated hydrocarbyl substitutents, perferably alkyl or alkenyl groups, of 1 to 9 carbon atoms. Thus the allylic moiety is one of 3 to 12 carbon atoms; alternatively, it may be considered an allyl moiety substituted with 0 to 9 carbon atoms. Although it is within the contemplated scope of the present invention to effect reaction at each nontertiary amino moiety, it is also within the contemplated scope to N-allylate only a portion of the nontertiary amino groups present, for example, to effect reaction at only one reactive site of an organic diamine. The process, in practice, will lead to the formation of mono- and di-allylic derivatives of any particular nontertiary amino nitrogen atom possessing two N-hydrogen substituents, depending upon the concentration of allylic reactant employed. For example, a primary amine such as aniline readily forms a N-(allylic) derivative and/or a N,N-bis(allylic) derivative, depending upon the quantity of allylic reactant used. The preferred amine product type comprises mono- or polyamines wherein each nontertiary amino group has undergone reaction to form the corresponding N-allylic derivative.

It will be apparent that a wide variety of N-allylic amines can be prepared by the process of the invention by varying the organic amine and the allylic reactants. Illustrative of these products are N-allylaniline prepared from aniline and allyl phenyl ether, N-methyl-2-butenylamine prepared from methylamine and crotyl acetate, β-(N-ethylmethallylamino)ethanol prepared from β-ethylaminoethanol and methallyl acetate, N,N-diethyl-2,7-octadienylamine and N,N-diethyl-1-vinyl-5-hexenylamine prepared from 1-vinyl-5-hexenyl acetate (3-acetoxy-1,7-octadiene), as well as other illustrative products such as N,N-diethylmethallylamine,
N-allylmorpholine,
N-(2-butenyl)morpholine,
N-(2,7-octadienyl)morpholine,
triallylamine,
β-(N-ethylallylamino)ethanol,
N-(2,7-octadienyl)aniline,
N-(3,6-dimethyl-2,7-octadienyl)-N-methylaniline,
N-(3,7-dimethyl-2,7-octadienyl)butylamine,
N-(2,3,6,7-tetramethyl-2,7-octadienyl)diethylamine,
N-(2,7-octadienyl)methylamine,
N,N'-bis(2,7-octadienyl)trimethylenediamine,
N-(3,6-dimethyl-2,7-octadienyl)-p-methoxyaniline,
N-(2,3,6,7-tetramethyl-2,7-octadienyl)piperidine,
N-allylpiperidine,
N-methallylpiperidine,
N,N'-bis(2,7-octadienyl)benzidine,
N-(3,7-dimethyl-2,7-octadienyl)butylamine,
N-(2,7-octadienyl)-α-naphthylamine,
N-(2,7-octadienyl)-m-dimethylaminoaniline,
N-(2,7-octadienyl)-3-chloroethylamine,
N-(3,6-dimethyl-2,7-octadienyl)-4-aminohexylamine,
4,4'-bis(2,7-octadienylamino)biphenyl,
N-(2,7-octadienyl)-4-acetoxybutylamine,
N-(3,6-dimethyl-2,7-octadienyl)-2-dodecylamine,
N-methallyl-2-dodecylamine,
N-(2-butenyl)-2-dodecylamine,
N-(2,7-octadienyl)-2,4-dichloroaniline, and
N-(2,7-octadienyl)cyclohexylamine.

The amine products of the invention are useful in a variety of applications. The tertiary amino moieties are oxidized to form tert-amine-N-oxides, useful as detergents, or are reacted with alkyl halides to form quaternary ammonium salts, useful as germicides, surface-active agents and textile-treating agents; for example, N,N-dimethyl-2,7-octadienylamine is converted with dilute hydrogen peroxide solution to a tert-amine-N-oxide having surface-active properties and useful as a detergent. The secondary amino moieties are converted to corresponding 2-haloacetamides, useful as herbicidal compounds; for example, N-(2,7-octadienyl)methylamine is reacted with 2-chloroacetyl chloride to produce N-methyl-N-(2,7-octadienyl)-2-chloroacetamide having herbicidal properties and useful as an herbicide. Additionally the remaining unsaturated linkages can be hydrated or hydroxylated to form useful alcohol derivatives from which esters or ethers are prepared. The ethylenic linkage serves as a dienophile in Diels-Alder condensations and also as a reactive site in polymerization or copolymerization processes.

Example 1

To a glass bomb tube were charged 22 parts by weight (0.3 mole) of diethylamine, 15 parts by weight (0.15 mole) of allyl acetate and 0.3 part by weight (0.0004 mole) of diacetatobis(triphenylphosphine)palladium(II) as catalyst. The bomb was sealed and placed in an oil bath maintained at 40° C. for 1½ hours. The bomb was then cooled and the product mixture removed and filtered. Gas-liquid chromatographic (GLC) analysis of the product mixture indicated a conversion of >95% based on diethylamine charged. From fractional distillation of the product mixture N,N-diethylallylamine was obtained in 100% selectivity based on a distilled yield of 65% of tertiary amine product.

Example 2

To a glass bomb tube were charged 14.6 parts by weight (0.2 mole) of diethylamine, 11.0 parts by weight (0.1 mole) of crotyl acetate and 0.15 part by weight (0.0002 mole) of diacetatobis(triphenylphosphine)palladium(II). The bomb was sealed and placed in an oil bath maintained at 43° C. for 1½ hours. The bomb was then cooled and the product mixture removed and filtered. The resulting two-phase reaction mixture was separated and GLC analysis of the former top layer, containing the product, indicated a conversion of >95% based on diethylamine charged. The product was a mixture of two tertiary amines which were separated by fractional distillation resulting in N,N-diethyl-2-butenylamine in 69% selectivity and N,N-diethylmethallylamine in 31% selectivity based on a distilled yield of 74% of tertiary amine product.

Example 3

To a glass bomb tube were charged 5 parts by weight (0.05 mole) of allyl acetate, 7.3 parts by weight (0.1 mole) of diethylamine and, as catalyst, 0.1 part by weight (0.0001 mole) of bromotris(triphenylphosphine)rhodium(I), prepared from rhodium tribromide and triphenylphosphine according to the procedure of copending application of K. C. Dewhirst, U.S. Ser. No. 417,482, filed Dec. 10, 1964. The bomb was sealed and placed in an oil bath maintained at 70° C. for six hours. The bomb was then cooled and the product mixture removed and filtered. GLC analysis of the product mixture indicated a conversion of 70% based on diethylamine charged with a selectively of 100% to N,N-diethylallylamine.

Example 4

To a glass bomb tube were charged 6.7 parts by weight (0.05 mole) of allyl phenyl ether, 4.5 parts by weight (0.05 mole) of β-ethylaminoethanol and 0.075 part by weight (0.0001 mole) of diacetatobis(triphenylphosphine)palladium(II). The bomb was sealed and placed in an oil bath maintained at 70° C. for about four hours. The bomb was then cooled and the product mixture removed and filtered. GLC analysis of product mixture indicated a conversion of >95% based on β-ethylaminoethanol charged. The tertiary amine product, β-(N-ethylallylamino)ethanol, was isolated in high selectivity by preparative GLC technique.

Example 5

To a glass bomb tube were charged 7.3 parts by weight (0.1 mole) of diethylamine, 5 parts by weight (0.05 mole) of allyl acetate and a catalyst mixture of 0.002 part by weight (0.0001 mole) of π-allylpalladium chloride, 0.054 part by weight (0.0002 mole) of triphenylphosphine and 0.0005 part by weight (0.00001 mole) of sodium borohydride, the borohydride being added last. The bomb was sealed and the exothermic reaction mixture was allowed to stand at ambient temperature for ½ hour. The bomb was then opened and the product mixture removed and filtered. GLC analysis of the product mixture indicated a conversion of >95% based on diethylamine charged with a selectivity of 90% to N,N-diethylallylamine.

Example 6

To a glass bomb tube were charged 7.3 parts by weight (0.1 mole) of diethylamine, 8.2 parts by weight (0.05 mole) of 1-vinyl-5-hexenyl acetate (3-acetoxy-1,7-octadiene) and 0.075 part by weight (0.0001 mole) of diacetatobis(triphenylphosphine)palladium(II). The bomb was sealed and placed in an oil both maintained at 70° C.

for six hours. The bomb was then cooled and the product mixture removed and filtered. The resulting two-phase reaction mixture was separated and GLC analysis of the former top layer, containing the products, indicated a conversion of >95% based on diethylamine charged with a selectivity of 85% to N,N-diethyl-2,7-octadienylamine and of 15% to N,N-diethyl-1-vinyl-5-hexenylamine.

Example 7

To a glass bomb tube were charged 7.3 parts by weight (0.1 mole) of diethylamine, 5 parts by weight (0.05 mole) of allyl acetate and a catalyst mixture of 0.079 part by weight (0.0001 mole) of dichlorobis(triphenylphosphine)platinum(II) and 0.005 part by weight (0.00001 mole) of sodium borohydride. The bomb was sealed and placed in an oil bath maintained at 70° C. for about 3½ hours. The bomb was then cooled and the product mixture removed and filtered. GLC analysis of the product mixture indicated a high conversion based on diethylamine charged with a high selectivity to N,N-diethylallylamine.

Example 8

To a glass bomb tube were charged 5 parts by weight (0.05 mole) of allyl acetate, 7.3 parts by weight (0.1 mole) of diethylamine and, as catalyst, 0.12 part by weight (0.0001 mole) of hydridotetrakis(triphenylphosphine)rhodium(I), prepared from chlorotris(triphenylphosphine)rhodium(I), triphenylphosphine, hydrazine and hydrogen according to the procedure of copending application of K. C. Dewhirst, U.S. Ser No. 473,222, filed July 19, 1965. The bomb was sealed and placed in an oil bath maintained at 70° C. for six hours. The bomb was then cooled and the product mixture removed and filtered. GLC analysis indicated a conversion of >95% based on diethylamine charged with a selectivity of 98% to N,N-diethylallylamine.

Example 9

Following the method of Example 4, various amines were reacted with various allylic reactants to yield the principal products indicated in the following table, Table I.

from 6 to 24 carbon atoms and from 1 to 2 phenolic hydroxyl groups attached to each aromatic ring, and
  (c) the carboxylate portion of the allylic carboxylate ester is an acyloxy moiety derived by removal of an active hydrogen atom from a carboxy group of a hydrocarbon carboxylic acid of 2 to 10 carbon atoms and from 1 to 2 carboxy groups, with the proviso that the carboxy groups are bonded to noncarboxy carbon, with
(B) a hydrocarbon amine or a substituted-hydrocarbon amine, containing at least one atom of oxygen incorporated as an ether, keto, ester or hydroxy group,
  (a) of up to 20 carbon atoms and
  (b) from 1 to 2 amino moieties, at least one of which has from 1 to 2 hydrogen substituents, and
  (c) the amount of nontertiary amino moiety of said amine reactant present for reaction is from about 0.25 to about 10 moles per mole of reactant (A),
(C) in the presence of from about 0.001 mole percent to about 1 mole percent based on total reactants of, as catalyst, a palladium, platinum or rhodium compound complexed with $R_3P$, wherein R
  (a) is a hydrocarbyl group of from 1 to 10 carbon atoms with only aromatic unsaturation and
  (b) is attached to the phosphorus atom by a carbon-phosphorus bond,
(D) at a temperature of from about 0° C. to about 120° C., whereby
(E) the aryloxy moiety of said allylic aryl ether reactant or the acyloxy moiety of said allylic carboxylate ester reactant is displaced by said amino moiety of reactant (B) to produce N-(allylic)amine.

2. The process according to claim 1 wherein the catalyst complex is introduced in a form represented by formula $$L_mMZ$$

TABLE I

| Allylic reactant | Amine reactant | | | | | | |
|---|---|---|---|---|---|---|---|
| | Diethylamine | Dimethylamine | Methylamine | Aniline | β-Ethylaminoethanol | Morpholine | Diallylamine |
| Phenoxy-2,7-octadiene | N,N-diethyl-2,7-octadienylamine. | N,N-dimethyl-2,7-octadienylamine. | N-(2,7-octadienyl)-methylamine. | N-(2,7-octadienyl)-aniline. | β-(N-ethyl-2,7-octadienylamino)-ethanol. | N-(2,7-octadienyl)morpholine. | N,N-diallyl-2,7-octadienylamine. |
| 3-phenoxy-1,7-octadiene | do | do | do | do | do | do | Do. |
| Phenoxy-2-octene | N,N-diethyl-2-butenylamine. | N,N-dimethyl-2-octenylamine. | N-(2-octenyl)-methylamine. | N-(2-octenyl)-aniline. | β-(N-ethyl-2-octenylamino)ethanol. | N-(2-octenyl)morpholine. | N,N-diallyl-2-octenylamine. |
| Crotyl phenyl ether | do | N,N-dimethyl-2-butenylamine. | N-methyl-2-butenylamine. | N-(2-butenyl)-aniline. | β-(N-ethyl-2-butenylamino)-ethanol. | N-(2-butenyl)-morpholine. | N,N-diallyl-2-butenylamine. |
| Allyl phenyl ether | N,N-diethylallylamine. | N,N-dimethylallylamine. | N-methylallylamine. | N-allylaniline. | (See Example 4). | N-allylmorpholine. | Triallylamine. |
| 2,7-octadienyl acetate | N,N-diethyl-2,7-octadienylamine. | N,N-dimethyl-2,7-octadienylamine. | N-(2,7-octadienyl)-methylamine. | N-(2,7-octadienyl)-aniline. | β-(N-ethyl-2,7-octadienylamino)-ethanol. | N-(2,7-octadienyl)morpholine. | N,N-diallyl-2,7-octadienylamine. |
| Crotyl acetate | (See Example 2). | N,N-dimethyl-2-butenylamine. | N-methyl-2-butenylamine. | N-(2-butenyl)-aniline. | β-(N-ethyl-2-butenylamino)-ethanol. | N-(2-butenyl)-morpholine. | N,N-diallyl-2-butenylamine. |
| Methallyl acetate | N,N-diethylmethallylamine. | N,N-dimethylmethallylamine. | N-methylmethallylamine. | N-methallylaniline. | β-(N-ethylmethallylamino)-ethanol. | N-methallylmorpholine. | N,N-diallylmethallylamine. |
| Allyl acetate | (See Example 1). | N,N-dimethylallylamine. | N-methylallylamine. | N-allylaniline. | β-(N-ethylallylamino)ethanol. | N-allylmorpholine. | Triallylamine. |

We claim as our invention:
1. The process of reacting
(A) an allylic aryl ether or an allylic carboxylate ester of an organic carboxylic acid, wherein
  (a) the allylic moiety is allyl substituted with 0 to 9 carbon atoms,
  (b) the aryl portion of the allylic aryl ether is an aryl moiety derived by removal of a hydroxyl group of a mono- to di-nuclear phenol having wherein L is $R_3P$, Z is a carboxylate of a lower unsubstituted monocarboxylic acid of 2 to 7 carbon atoms, and m is the integer 2 when M is palladium or platinum, and, when M is rhodium, Z is a halide selected from the group of chloride and bromide and m is the integer 3 or Z hydrogen and m is the integer 4.

3. The process according to claim 1 wherein the catalyst complex is produced in situ by introduction of a π-allyl metal halide, $R_3P$ and sodium borohydride.

4. The process according to claim 1 wherein the amine reactant is a primary or secondary hydrocarbon monoamine in which the hydrocarbon moiety is hydrocarbon of up to 12 carbon atoms.

5. The process according to claim 2 wherein the catalyst complex is introduced as diacetatobis(triphenylphosphine)palladium(II).

6. The process according to claim 4 wherein the hydrocarbon monoamine reactant is methyl amine, the allylic reactant is phenoxy-2,7-octadiene and the N-(allylic)-amine produced is N-(2,7-octadienyl)methylamine.

7. The process according to claim 4 wherein the hydrocarbon monoamine reactant is a dialkyl amine in which any alkyl moiety is alkyl of up to 4 carbon atoms.

8. The process according to claim 7 wherein the dialkylamine is dimethylamine, the allylic reactant is phenoxy-2,7-octadiene and the N-(allylic)amine produced is N,N-dimethyl-2,7-octadienylamine.

References Cited

UNITED STATES PATENTS

| | | |
|---|---|---|
| 2,172,822 | 9/1939 | Tamele et al. _____ 260—577 X |
| 2,187,745 | 1/1940 | Lazier. |
| 2,532,277 | 12/1950 | Castle. |

CHARLES B. PARKER, Primary Examiner

R. L. RAYMOND, Assistant Examiner

U.S. Cl. X.R.

252—431; 260—247, 293, 296, 326.8, 429, 563, 576, 577, 584, 585